Figure 1:
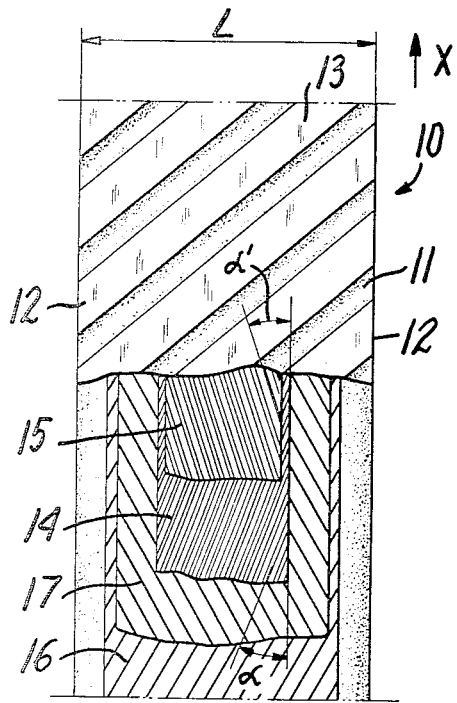

United States Patent [19]

Roger

[11] 4,194,548

[45] Mar. 25, 1980

[54] TIRES

[75] Inventor: Jack Roger, Romagnat, France

[73] Assignee: Compagnie Generale des Etablissements Michelin, Clermont-Ferrand, France

[21] Appl. No.: 898,470

[22] Filed: Apr. 20, 1978

[30] Foreign Application Priority Data

Apr. 24, 1977 [FR] France .................. 77 13473

[51] Int. Cl.$^2$ ............................................. B60C 9/20
[52] U.S. Cl. ............................................. 152/361 R
[58] Field of Search .................. 152/354, 355, 361 R, 152/375, 374, 360

[56] References Cited

U.S. PATENT DOCUMENTS

| | | | |
|---|---|---|---|
| 3,175,598 | 3/1965 | Cegnar | 152/361 R |
| 3,224,482 | 12/1965 | Barassi et al. | 152/361 |

*Primary Examiner*—Richard A. Bertsch
*Attorney, Agent, or Firm*—Brumbaugh, Graves, Donohue & Raymond

[57] ABSTRACT

Tire with a radial carcass reinforcement, a tread reinforcement and a tread having transverse grooves and a nongrooved portion arranged between the bottoms of the transverse grooves and the tread reinforcement is improved due to the fact that the tread comprises, in said non-grooved portion, at least one ply of relatively inextensible oblique wires or cables forming an angle of at most 60° with the circumferential direction, the axial width of said ply being between ¼ and ½ of the width of the tread.

8 Claims, 4 Drawing Figures

TIRES

The present invention relates to improvements in tires of the type having a radial carcass reinforcement and more particularly to treads of such tires which have transverse grooves separating elements in relief and provided with at least two oblique plies of wires or cables which are parallel in each ply, but crossed from one ply to the other.

By transverse grooves, there are understood grooves whose orientation at the bottom or the orientation of the middle line of the bottom of which exceeds an angle of 45° with respect to the longitudinal or circumferential direction of the tire. Such transverse grooves serve to impart to the tire adherence in the longitudinal direction, namely upon braking, upon starting, or upon the acceleration of the vehicle.

Particularly in the case of tires of the type in question which carry heavy loads and/or transmit high circumferential forces when travelling over rough ground off the highway, the elements in relief defined by the transverse grooves of the tread are subjected to considerable complex stresses. Thus, in the region where these elements are implanted in the bottom of the tread, that is to say at the level of the bottom of said transverse grooves, considerable shearing stresses act. Furthermore, despite the sometimes relatively large diameter of such tires, the treads are subjected to great variations in curvature in the circumferential direction. These variations, which are increased by the roughnesses in the ground, result in substantial repeated fatigue stresses at the level of the bottom of the transverse grooves. The elastomeric mixture forming the bottom of the transverse grooves starts to split at the surface, particularly when transverse grooves are arranged in the median zone of the tread. Whatever the direction of travel of the tire, the crack which is substantially parallel to the trace of the transverse grooves widens and becomes deeper in the direction towards the reinforcement of the tread, despite the fact that the reinforcement thereof is formed, at least in part, of plies of quasi-longitudinal wires or cables.

There is thus involved a different phenomenon from that which affected the treads of tires of the bias carcass reinforcement type, the bottoms of the linear circumferential grooves of which exhibited longitudinal slits or cracks. Thus, U.S. Pat. No. 2,198,483 recommends providing a narrow ply of textile cords in the vicinity of the bottoms of the circumferential grooves and transversely to said bottoms.

It is also known from U.S. Pat. No. 3,589,425 to provide, from one edge to the other of the tread of an airplane tire with bias carcass reinforcement and linear circumferential grooves, on the one hand, plies of oblique textile cords which are flush with the bottoms of the circumferential grooves so as to oppose the effects of centrifugal force on the tread, and, on the other hand, two symmetrically crossed oblique plies composed of hyperelastic metallic cables having a relative elongation of between 15% and 40%, these plies being embedded between the bottoms of the circumferential grooves and the bias carcass reinforcement of the tire, in order to constitute a screen for cuts caused by various cutting objects which may be present on the runways of the airports.

The object of the present invention, on the other hand, is to prevent the occurrence of the cracks and possibly their propagation in the direction towards the radial carcass reinforcement, which is generally metallic, of tires of the type in question.

Thus, the tire in accordance with the invention, having, on the one hand, a radial carcass reinforcement and a tread reinforcement formed of at least two plies of oblique wires or cables which are parallel in each ply and crossed from one ply to the other and, on the other hand, a tread having transverse grooves the bottoms and the walls of which define elements in relief and a nongrooved portion arranged between the bottoms of the transverse grooves and the tread reinforcement, is characterized by the fact that the tread comprises, in said nongrooved portion, at least one ply of relatively inextensible oblique wires or cables forming an angle of at most 60° with the circumferential direction, the axial width of said ply being between ¼ and ½ of the width of the tread.

By relatively inextensible wires or cables there are understood, preferably, steel wires or cables but other materials can be employed. The cables may be each surrounded by a wire wound around the cable with a pitch definitely less than the pitch of the cable assemblage and sometimes of a direction opposite to that of the cable assemblage, these cables having a relative elongation which is less than 0.5% under a load equal to 10% of their rupture load.

It is advantageous to use two plies, the wires or cables of which form angles of less than 30° with the circumferential direction, and preferably angles between 12° and 24°. Preferably also these wires or cables are crosswise those of the adjacent ply.

It has also been found advantageous to arrange the oblique ply or plies in accordance with the invention at a radial distance from the bottoms of the transverse grooves which is less than ½, and preferably close to ⅓, of the distance between the bottoms of the transverse grooves and the tread reinforcement ply closest to the tread. This distance may possibly vary in the transverse direction and, in case of the use of at least two oblique plies in accordance with the invention, it is the average distance of the assembly formed by these two plies.

In most cases, an axial width of the oblique ply or plies in accordance with the invention which is equal to about ⅓ of the width of the tread in new condition is sufficiently measured along the surface thereof which is intended to come into contact with the ground, the tire mounted in normal manner and inflated to a pressure corresponding to its rated load. The oblique ply or plies in accordance with the invention are centered on the zone of the tread which contains the transverse grooves. When the arrangement of the transverse grooves is symmetrical with respect to the equatorial plane of the tire, the oblique ply or plies in accordance with the invention are centered on the equator of the tread.

In certain cases, a width which is definitely less than that of the transversely grooved zone is sufficient to prevent the occurrence of cracks or their propagation.

When at least two superposed plies are provided, it is possible for these two plies to be of different width.

The drawing and the part of the description which refers thereto are intended to illustrate embodiments of the present invention.

Figure 3:
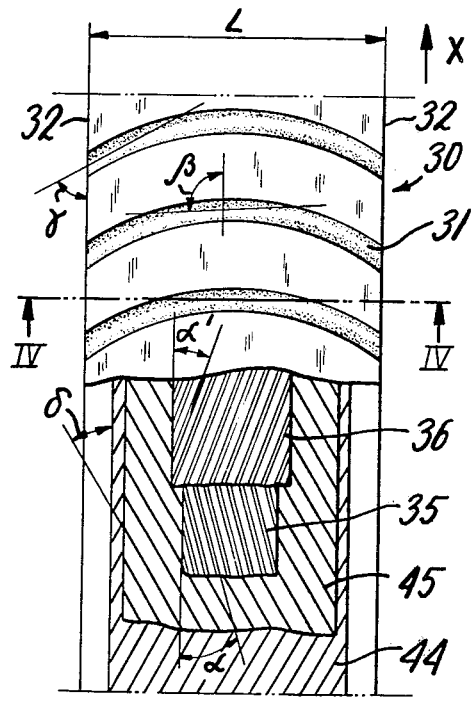
Figure 2:
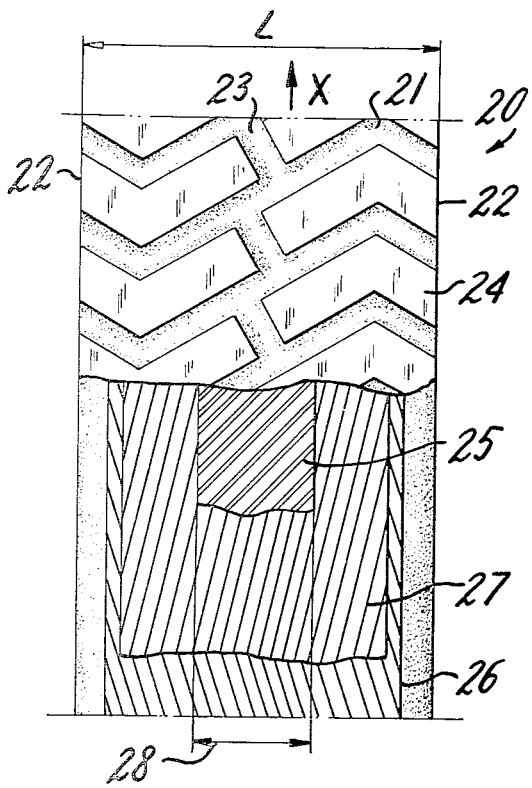
Figure 4:
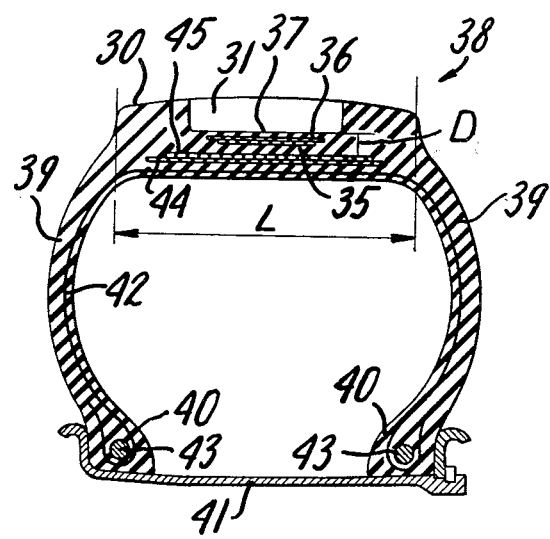

In the drawing:

FIGS. 1 to 3 show, in developed plan view, parts of treads having transverse grooves defining elements in relief, shown peeled away in order to show the axial arrangement of the oblique ply or plies in accordance with the invention, and FIG. 4 is a radial cross section through the tire of FIG. 3 taken along the line IV—IV in FIG. 3.

FIG. 1 shows a portion of a tread 10 having transverse grooves 11 oriented at 50° with respect to the circumferential direction X and extending between the two edges 12 of the tread 10. These transverse grooves 11 and the edges 12 of the tread 10 define elements in relief or blocks 13.

In accordance with the invention, two plies 14 and 15 of relatively inextensible oblique wires or cables, which plies are superimposed and oriented in opposite direction, are centered on the axis of the tread 10 above the oblique plies 16 and 17 which form the tread reinforcement. The ply 15, which is closest to the bottoms of the transverse grooves 11 has, in this example, an axial width less than the width of the underlying ply 14, each of these axial widths being between $\frac{1}{4}$ and $\frac{1}{2}$ of the width L of the tread 10. It is advantageous, furthermore, for the ply 15 to be oriented in the direction opposite that of the transverse grooves 11. The cables of these plies 14 and 15 form angles $\alpha, \alpha'$ less than 30°, in opposite direction to one another, with the circumferential direction X.

FIG. 2 shows a portion of a tread 20 having zigzag transverse grooves 21 oriented at ± 60° with respect to the circumferential direction X and extending between the two edges 22 of the tread 20. Between two consecutive transverse grooves 21 there is located a circumferential groove 23 oriented at 30° with respect to the circumferential direction. The grooves 21 and 23 and the edges 22 of the tread define elements in relief or blocks 24. In accordance with the invention, a ply 25 of relatively inextensible oblique wires or cables is centered on the zone common to the grooves 21 and 23. This ply 25 is radially closer to the bottoms of the grooves 21 and 23 than to the tread reinforcement, formed in this case of two oblique plies 26 and 27 of cables which are crosswise from one ply to the other. The axial width 28 of the ply 25 is not less than $\frac{1}{4}$ of the width L of the tread 20.

In accordance with a preferred feature, the zone occupied by the oblique ply 25 in accordance with the invention corresponds to the zone common to the grooves 21 and 23, that is to say to the zone of the tread 20 where the ratio between the surface occupied by the transverse grooves and the surface occupied by the elements in relief is largest.

FIG. 3 shows a portion of tread 30 comprising curved transverse grooves 31. The bottoms of these transverse grooves 31 form an angle $\gamma$ of about 60° with the circumferential direction X on the edges 32 of the tread 30 and an angle $\beta$ of 90° in the equatorial zone.

In accordance with another preferred feature of the invention, the plies 35, 36 of relatively inextensible oblique wires or cables are centered on the zone of the tread 30 in which the bottoms of the transverse grooves 31 form the largest angle with the circumferential direction X. In the case of the tread 30 of FIG. 3, this zone is the equatorial zone. Likewise, the wires or cables of plies 35, 36 form angles $\alpha, \alpha'$, of opposite direction, of between 12° and 24° with the circumferential direction. The ply 36 which is closest to the bottoms of the transverse grooves 31 has, in this example, an axial width greater than the width of the underlying ply 35, without any of these axial widths being less than $\frac{1}{4}$ of the width L of the tread 30 nor greater than $\frac{1}{2}$ of said width L.

FIG. 4 shows a radial cross section through a tire of the type in question having a tread in accordance with FIG. 3, the radial cross section through the tread having been taken along the line IV—IV in FIG. 3.

In the tread 30 there can be noted the transverse grooves 31 and their bottom 37. The tire 38 has sidewalls 39 each of which is terminated by a bead 40; it is mounted on a rim 41. The carcass reinforcement of the tire 38 comprises essentially a carcass ply of radial steel cables 42 anchored to the bead rings 43. The tread reinforcement is formed, extending radially towards the outside of the tire 38, of two oblique plies 44 and 45 of steel cables which are crossed and have a slight inclination ($\delta$ about 24°) with respect to the circumferential direction X.

In accordance with the invention, two superimposed plies 35 and 36 of relatively inextensible steel cable, similar to those used in the plies 44 and 45, are arranged in the equatorial zone where the transverse grooves 31 have the greatest inclination $\beta$ (close to 90°) with respect to the circumferential direction X. These plies 35 and 36 are arranged at an average distance from the bottoms 37 of the transverse grooves 31 which is approximately equal to $\frac{1}{3}$ of the radial distance D between the bottoms 37 and the tread reinforcement proper, that is to say the radially outer face of the tread reinforcement ply 45. This radial distance D defines, in thickness, the nongrooved zone of the tread 30.

What is claimed is:

1. Tire having, on the one hand, a radial carcass reinforcement and a tread reinforcement formed of at least two plies of oblique wires or cables which are parallel in each ply and crossed from one ply to the other and, on the other hand, a tread having transverse grooves, the bottoms and the walls of which define elements in relief, and a nongrooved portion arranged between the bottoms of the transverse grooves and the tread reinforcement, characterized by the fact that the tread comprises, in said nongrooved portion, at least one ply of relatively inextensible oblique wires or cables forming an angle of at most 60° with the circumferential direction, the axial width of said ply being between $\frac{1}{4}$ and $\frac{1}{2}$ of the width of the tread.

2. Tire according to claim 1, characterized by the fact that two plies of crossed relatively inextensible oblique wires or cables are used in said nongrooved portion.

3. Tire according to claim 2, characterized by the fact that said two plies have different widths.

4. Tire according to claim 1 or 2, characterized by the fact that the relatively inextensible oblique wires or cables of the ply or plies in said nongrooved portion form an angle of less than 30°, and preferably between 12° and 24°, with the circumferential direction.

5. Tire according to claim 1 or 2, characterized by the fact that the ply or plies of relatively inextensible oblique wires or cables are arranged at a radial distance from the bottoms of the transverse grooves which is less than $\frac{1}{2}$, and preferably close to $\frac{1}{3}$, of the distance between the bottoms of the transverse grooves and the tread reinforcement ply closest to the tread.

6. Tire according to claim 1 or 2, characterized by the fact that the ply or plies of relatively inextensible oblique wires or cables are centered on the zone of the tread which contains the transverse grooves which are most greatly inclined to the circumferential direction and/or which has the highest proportion of such transverse grooves.

7. Tire according to claim 6, characterized by the fact that said zone is the median zone of the tread and by the fact that the ply or plies of relatively inextensible oblique wires or cables are centered on said zone.

8. Tire according to claim 1 or 2, characterized by the fact that the ply of relatively inextensible oblique wires or cables which is closest to the bottoms of the transverse grooves is arranged at an angle of opposite direction to the angle which said bottoms form with the circumferential direction.

* * * * *

UNITED STATES PATENT AND TRADEMARK OFFICE
CERTIFICATE OF CORRECTION

PATENT NO. : 4,194,548
DATED : March 25, 1980
INVENTOR(S) : Jack Roger

It is certified that error appears in the above-identified patent and that said Letters Patent are hereby corrected as shown below:

First page, Item [30], "Apr. 24, 1977" should read
-- Apr. 28, 1977 --.

Signed and Sealed this

Twenty-ninth Day of July 1980

[SEAL]

*Attest:*

SIDNEY A. DIAMOND

*Attesting Officer*     *Commissioner of Patents and Trademarks*